(12) United States Patent
Cheng et al.

(10) Patent No.: US 8,996,004 B2
(45) Date of Patent: Mar. 31, 2015

(54) METHODS AND SYSTEMS FOR MANUAL CELL SELECTION IN BOUNDARY AREA FOR WIRELESS DEVICES

(75) Inventors: Steven D. Cheng, San Diego, CA (US); Guangming Carl Shi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1267 days.

(21) Appl. No.: 12/260,325

(22) Filed: Oct. 29, 2008

(65) Prior Publication Data

US 2010/0105392 A1    Apr. 29, 2010

(51) Int. Cl.
*H04W 36/00* (2009.01)
*H04W 48/16* (2009.01)
*H04W 36/08* (2009.01)
*H04W 48/20* (2009.01)

(52) U.S. Cl.
CPC .............. *H04W 48/16* (2013.01); *H04W 36/08* (2013.01); *H04W 48/20* (2013.01)
USPC ............ 455/436; 455/438; 455/437; 370/331

(58) Field of Classification Search
CPC ..... H04W 80/04; H04W 36/12; H04W 36/18; H04M 36/30
USPC ........ 455/435.1, 435.2, 435.3, 436, 437, 438; 370/331
See application file for complete search history.

(56) References Cited

U.S. PATENT DOCUMENTS

| | | | |
|---|---|---|---|
| 4,737,978 A * | 4/1988 | Burke et al. | ................... 455/438 |
| 7,065,361 B1 | 6/2006 | Fortuna | |
| 2002/0059453 A1 | 5/2002 | Eriksson et al. | |
| 2002/0072388 A1 | 6/2002 | Korneluk et al. | |
| 2002/0098857 A1 * | 7/2002 | Ishii | .............................. 455/502 |
| 2002/0183062 A1 * | 12/2002 | Kubosawa | .................... 455/436 |
| 2002/0193111 A1 * | 12/2002 | Wallstedt et al. | ............. 455/434 |
| 2004/0121773 A1 | 6/2004 | O'brien | |
| 2005/0090277 A1 | 4/2005 | Islam et al. | |
| 2006/0063530 A1 | 3/2006 | Niu | |
| 2007/0217291 A1 * | 9/2007 | Jeong et al. | ..................... 368/21 |

(Continued)

FOREIGN PATENT DOCUMENTS

| | | |
|---|---|---|
| EP | 1246490 | 10/2002 |
| TW | 200603570 | 1/2006 |
| WO | WO2007138530 | 12/2007 |

OTHER PUBLICATIONS

International Search Report—PCT/US2009/061103—International Search Authority, European Patent Office, Feb. 15, 2010.
Written Opinion—PCT/US2009/061103—International Search Authority European Patent Office—Feb. 15, 2010.

(Continued)

*Primary Examiner* — Danh Le
(74) *Attorney, Agent, or Firm* — Tyler J. Overall

(57) ABSTRACT

Certain embodiments of the present disclosure provide techniques for selecting a new cell, from a plurality of cells in a boundary area between first and second coverage areas, for a wireless device. The first and second coverage areas may include, for example, include cells controlled by first and second operators or cells in different time zones. In either case, the techniques may facilitate giving preference to cells in a same coverage area as a current cell. The wireless device may then select a cell from the list of neighbor cells as the new cell.

28 Claims, 11 Drawing Sheets

(56) References Cited

U.S. PATENT DOCUMENTS

2007/0255797 A1   11/2007  Dunn et al.
2008/0090559 A1*  4/2008  Lee et al. .................. 455/414.3
2008/0153474 A1*  6/2008  Scott ............................ 455/418
2008/0247276 A1* 10/2008  Jeong et al. ..................... 368/10
2009/0061868 A1*  3/2009  Kazmi ....................... 455/435.1

OTHER PUBLICATIONS

Taiwan Search Report—TW098136737—TIPO—Oct. 30, 2012.
3GPP, ETSI TS 125 331 V2.10.0 (Mar. 2002), Universal Mobil Telecommunications System (UMTS); Radio Ressource Control (RRC) Protocol Specification (3GPP TS 25.331 Version 3.10.0 Release 1999).

\* cited by examiner

METHODS AND SYSTEMS FOR MANUAL CELL SELECTION IN BOUNDARY AREA FOR WIRELESS DEVICES

TECHNICAL FIELD

The present disclosure generally relates to wireless communication, and more particularly, to the selection of newly serving cells from a plurality of neighbor cells during a handover process.

SUMMARY

Certain embodiments of the present disclosure provide techniques for selecting a new cell, from a plurality of cells in a boundary area between first and second coverage areas, for a wireless device to camp on. The method generally includes giving preference, when building a list of neighbor cells to consider as the new cell, to cells in a same coverage area as a current camped cell. The wireless device may then select a cell from the list of neighbor cells as the new cell to camp on.

Certain embodiments of the present disclosure provide a method for selecting a new cell, from a plurality of cells in a boundary area between first and second time zones, for a wireless device to camp on. The method generally includes deriving first time information from a current camped cell in a first time zone the wireless device is currently camped on, deriving second time information from a neighbor cell in a second time zone different from the first time zone, and presenting the first and second time information to a user of the wireless device.

Certain embodiments of the present disclosure provide an apparatus for selecting a new cell, from a plurality of cells in a boundary area between first and second coverage areas, for a wireless device to camp on. The apparatus generally includes logic for giving preference, when building a list of neighbor cells to consider as the new cell, to cells in a same coverage area as a current camped cell. The wireless device may then select a cell from the list of neighbor cells as the new cell to camp on.

Certain embodiments of the present disclosure provide an apparatus for selecting a new cell, from a plurality of cells in a boundary area between first and second time zones, for a wireless device to camp on. The apparatus generally includes logic for deriving first time information from a current camped cell in a first time zone the wireless device is currently camped on, logic for deriving second time information from a neighbor cell in a second time zone different from the first time zone, and logic for presenting the first and second time information to a user of the wireless device.

Certain embodiments of the present disclosure provide an apparatus for selecting a new cell, from a plurality of cells in a boundary area between first and second coverage areas, for a wireless device to camp on. The apparatus generally includes means for giving preference, when building a list of neighbor cells to consider as the new cell, to cells in a same coverage area as a current camped cell. The wireless device may then select a cell from the list of neighbor cells as the new cell to camp on.

Certain embodiments of the present disclosure provide an apparatus for selecting a new cell, from a plurality of cells in a boundary area between first and second time zones, for a wireless device to camp on. The apparatus generally includes means for deriving first time information from a current camped cell in a first time zone the wireless device is currently camped on, means for deriving second time information from a neighbor cell in a second time zone different from the first time zone, and means for presenting the first and second time information to a user of the wireless device.

Certain embodiments of the present disclosure provide a computer-program product for selecting a new cell, from a plurality of cells in a boundary area between first and second coverage areas, for a wireless device to camp on, comprising a computer readable medium having instructions stored thereon, the instructions being executable by one or more processors. The instructions generally include instructions for giving preference, when building a list of neighbor cells to consider as the new cell, to cells in a same coverage area as a current camped cell. The wireless device may then select a cell from the list of neighbor cells as the new cell to camp on.

Certain embodiments of the present disclosure provide a computer-program product for selecting a new cell, from a plurality of cells in a boundary area between first and second time zones, for a wireless device to camp on, comprising a computer readable medium having instructions stored thereon, the instructions being executable by one or more processors. The instructions generally include instructions for deriving first time information from a current camped cell in a first time zone the wireless device is currently camped on, instructions for deriving second time information from a neighbor cell in a second time zone different from the first time zone, and instructions for presenting the first and second time information to a user of the wireless device.

BRIEF DESCRIPTION OF THE DRAWINGS

So that the manner in which the above-recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

DETAILED DESCRIPTION

Figure 1:
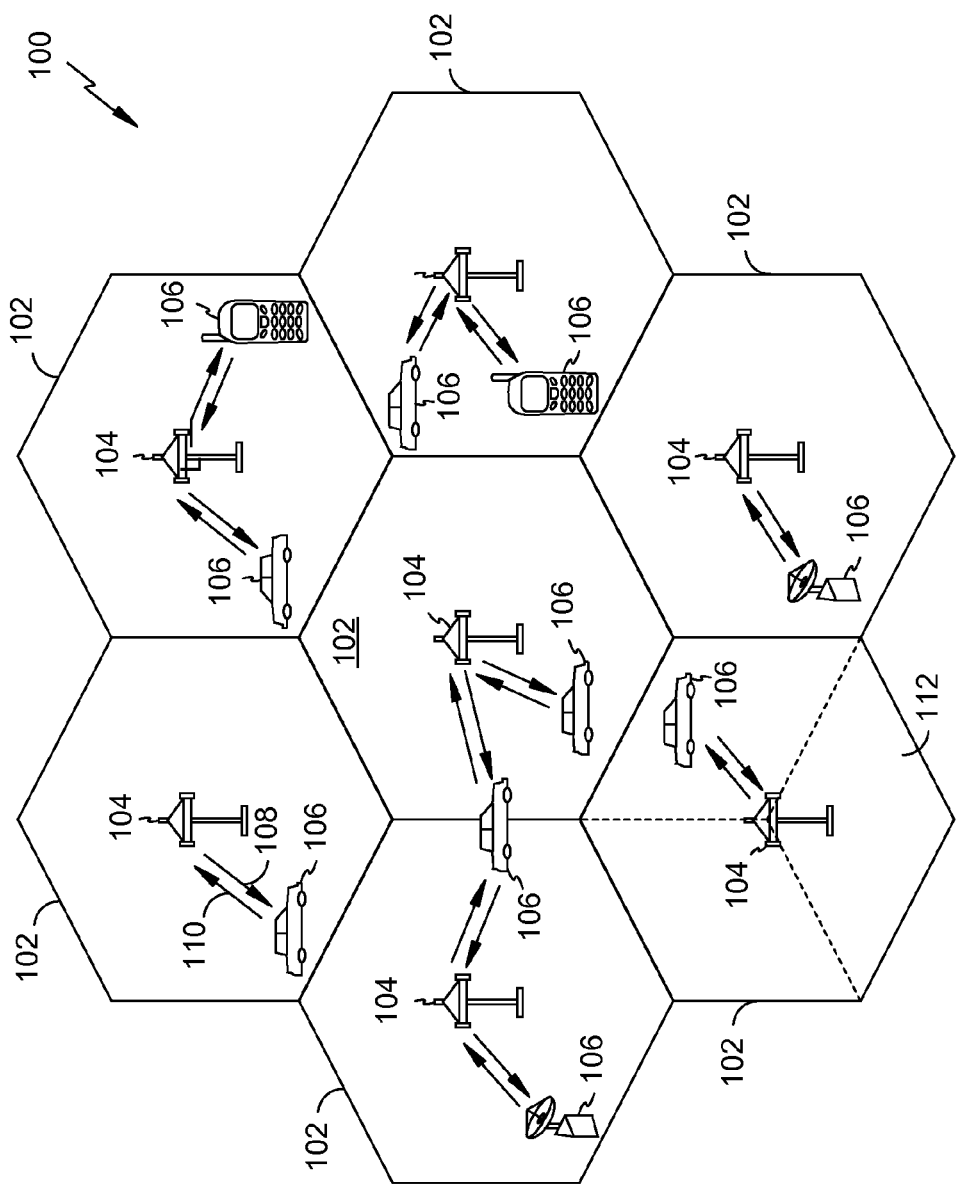
FIG. 1 illustrates an example wireless communication system, in accordance with certain embodiments of the present disclosure.

The word "exemplary" is used herein to mean "serving as an example, instance, or illustration." Any embodiment described herein as "exemplary" is not necessarily to be construed as preferred or advantageous over other embodiments.

Various problems may be encountered in the boundary area between neighboring cells in a wireless communication. For example, mobile stations often rely on the base station time for clock synchronization.

In a boundary area where there is no coordination between operators, a wireless device may frequently switch between base stations belonging to different operators causing the wireless device protocol stack to execute the cell reselection in a much more frequent way, which will affect the voice and data connection quality. Furthermore, the mobile users may notice that the displayed time may change hour information every time when the camped base station is changed and the newer camped base station is in a different time zone, even if there is only a single operator. This is another scenario that may result in frequent switching.

Frequent switching for cell reselection may increase power consumption, as well as various other processing-related overhead (resulting in increased MIPS consumption), such as RF calibration, and oscillator tuning.

Exemplary Wireless Communication System

The techniques described herein may be used for various broadband wireless communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

One specific example of a communication system based on an orthogonal multiplexing scheme is a WiMAX system. WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses, for example. Mobile WiMAX offers the full mobility of cellular networks at broadband speeds.

IEEE 802.16x is an emerging standard organization to define an air interface for fixed and mobile broadband wireless access (BWA) systems. These standards define at least four different physical layers (PHYs) and one media access control (MAC) layer. The OFDM and OFDMA physical layer of the four physical layers are the most popular in the fixed and mobile BWA areas respectively.

FIG. 1 illustrates an example of a wireless communication system 100 in which embodiments of the present disclosure may be employed. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a Node B or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers, etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques. If this is the case, the wireless communication system 100 may be referred to as an OFDM/OFDMA system.

A communication link that facilitates transmission from a base station 104 to a user terminal 106 may be referred to as a downlink (DL) 108, and a communication link that facilitates transmission from a user terminal 106 to a base station 104 may be referred to as an uplink (UL) 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
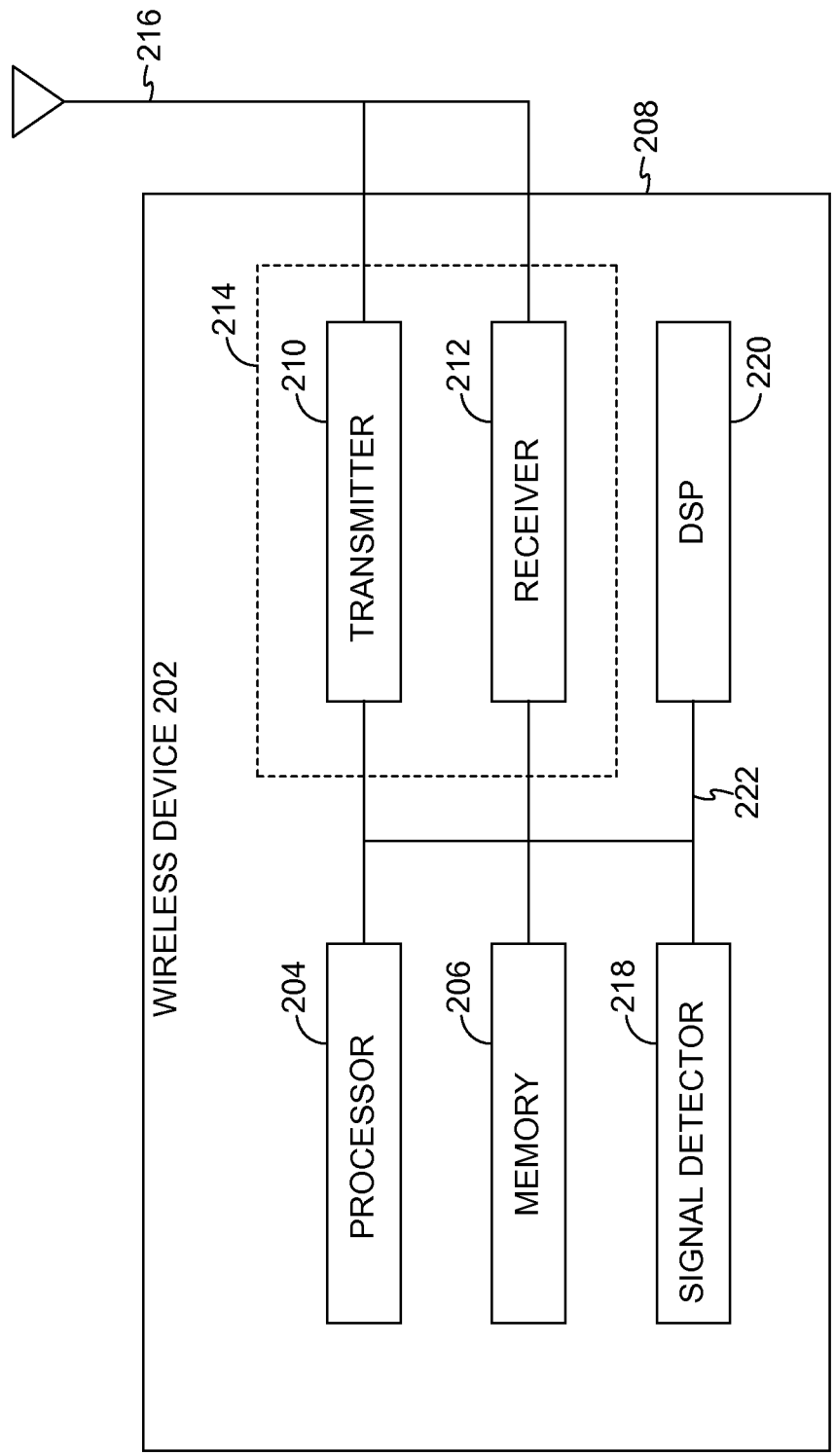
FIG. 2 illustrates various components that may be utilized in a wireless device in accordance with certain embodiments of the present disclosure.

FIG. 2 illustrates various components that may be utilized in a wireless device 202 that may be employed within the wireless communication system 100. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
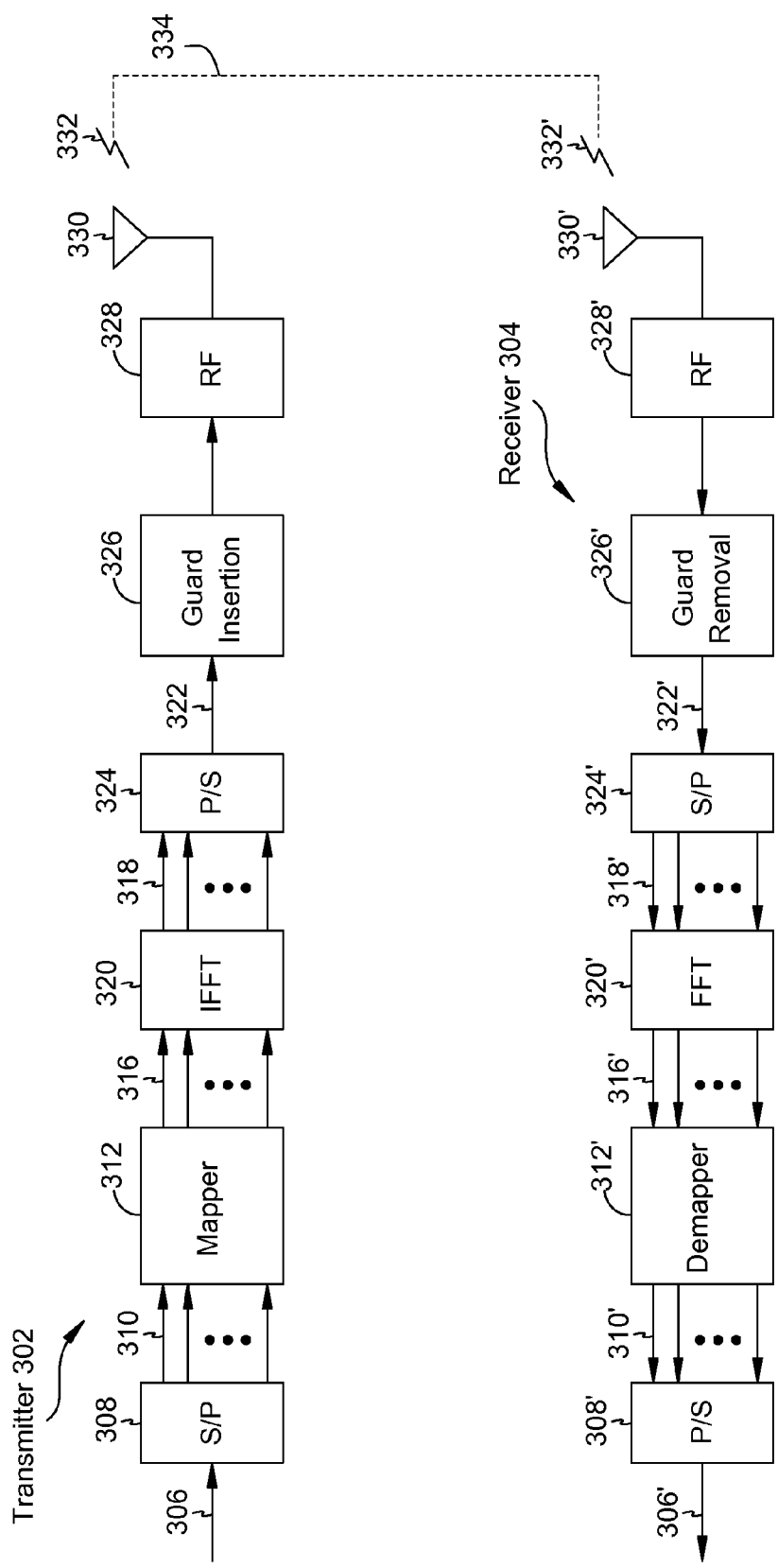
FIG. 3 illustrates an example transmitter and an example receiver that may be used within a wireless communication system in accordance with certain embodiments of the present disclosure.

FIG. 3 illustrates an example of a transmitter 302 that may be used within a wireless communication system 100 that utilizes OFDM/OFDMA. Portions of the transmitter 302 may be implemented in the transmitter 210 of a wireless device 202. The transmitter 302 may be implemented in a base station 104 for transmitting data 306 to a user terminal 106 on a downlink 108. The transmitter 302 may also be implemented in a user terminal 106 for transmitting data 306 to a base station 104 on an uplink 110.

Data 306 to be transmitted is shown being provided as input to a serial-to-parallel (S/P) converter 308. The S/P converter 308 may split the transmission data into M parallel data streams 310.

The M parallel data streams 310 may then be provided as input to a mapper 312. The mapper 312 may map the M parallel data streams 310 onto M constellation points. The mapping may be done using some modulation constellation, such as binary phase-shift keying (BPSK), quadrature phase-shift keying (QPSK), 8 phase-shift keying (8PSK), quadrature amplitude modulation (QAM), etc. Thus, the mapper 312 may output M parallel symbol streams 316, each symbol stream 316 corresponding to one of the M orthogonal subcarriers of the inverse fast Fourier transform (IFFT) 320. These M parallel symbol streams 316 are represented in the frequency domain and may be converted into M parallel time domain sample streams 318 by an IFFT component 320.

A brief note about terminology will now be provided. M parallel modulations in the frequency domain are equal to M modulation symbols in the frequency domain, which are equal to M mapping and M-point IFFT in the frequency domain, which is equal to one (useful) OFDM symbol in the time domain, which is equal to M samples in the time domain. One OFDM symbol in the time domain, NS, is equal to NCP (the number of guard samples per OFDM symbol)+M (the number of useful samples per OFDM symbol).

The M parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of the guard insertion component 326 may then be upconverted to a desired transmit frequency band by a radio frequency (RF) front end 328. An antenna 330 may then transmit the resulting signal 332.

FIG. 3 also illustrates an example of a receiver 304 that may be used within a wireless device 202 that utilizes OFDM/OFDMA. Portions of the receiver 304 may be implemented in the receiver 212 of a wireless device 202. The receiver 304 may be implemented in a user terminal 106 for receiving data 306 from a base station 104 on a downlink 108. The receiver 304 may also be implemented in a base station 104 for receiving data 306 from a user terminal 106 on an uplink 110.

The transmitted signal 332 is shown traveling over a wireless channel 334. When a signal 332' is received by an antenna 330', the received signal 332' may be downconverted to a baseband signal by an RF front end 328'. A guard removal component 326' may then remove the guard interval that was inserted between OFDM/OFDMA symbols by the guard insertion component 326.

The output of the guard removal component 326' may be provided to an S/P converter 324'. The S/P converter 324' may divide the OFDM/OFDMA symbol stream 322' into the M parallel time-domain symbol streams 318', each of which corresponds to one of the M orthogonal subcarriers. A fast Fourier transform (FFT) component 320' may convert the M parallel time-domain symbol streams 318' into the frequency domain and output M parallel frequency-domain symbol streams 316'.

A demapper 312' may perform the inverse of the symbol mapping operation that was performed by the mapper 312 thereby outputting M parallel data streams 310'. A P/S converter 308' may combine the M parallel data streams 310' into a single data stream 306'. Ideally, this data stream 306' corresponds to the data 306 that was provided as input to the transmitter 302. Note that elements 308', 310', 312', 316', 320', 318' and 324' may all be found on a in a baseband processor 340'.

Exemplary Manual Cell Selection in a Boundary Area with Multiple Operators

Certain embodiments of the present disclosure provide techniques for selecting a new cell, from a plurality of cells in a boundary area between first and second coverage areas, for a wireless device to camp on. The first and second coverage areas may include, for example, include cells controlled by first and second operators or cells in different time zones. In either case, the method may include giving preference, when building a list of neighbor cells to consider as the new cell, to cells in a same coverage area as a current camped cell. The wireless device may then select a cell from the list of neighbor cells as the new cell to camp on.

Certain embodiments of the present disclosure provide techniques for cell re-selection that may help avoid or reduce frequent switching between cells in boundary regions where neighbor cells are controlled by different operators and/or belong to different time zones. As a result, quality of voice and data connections may be improved in such boundary areas. Furthermore, power consumption and processing overhead related to cell re-selection (e.g., for RF calibration and oscillator tuning) may also be reduced.

Figure 4:
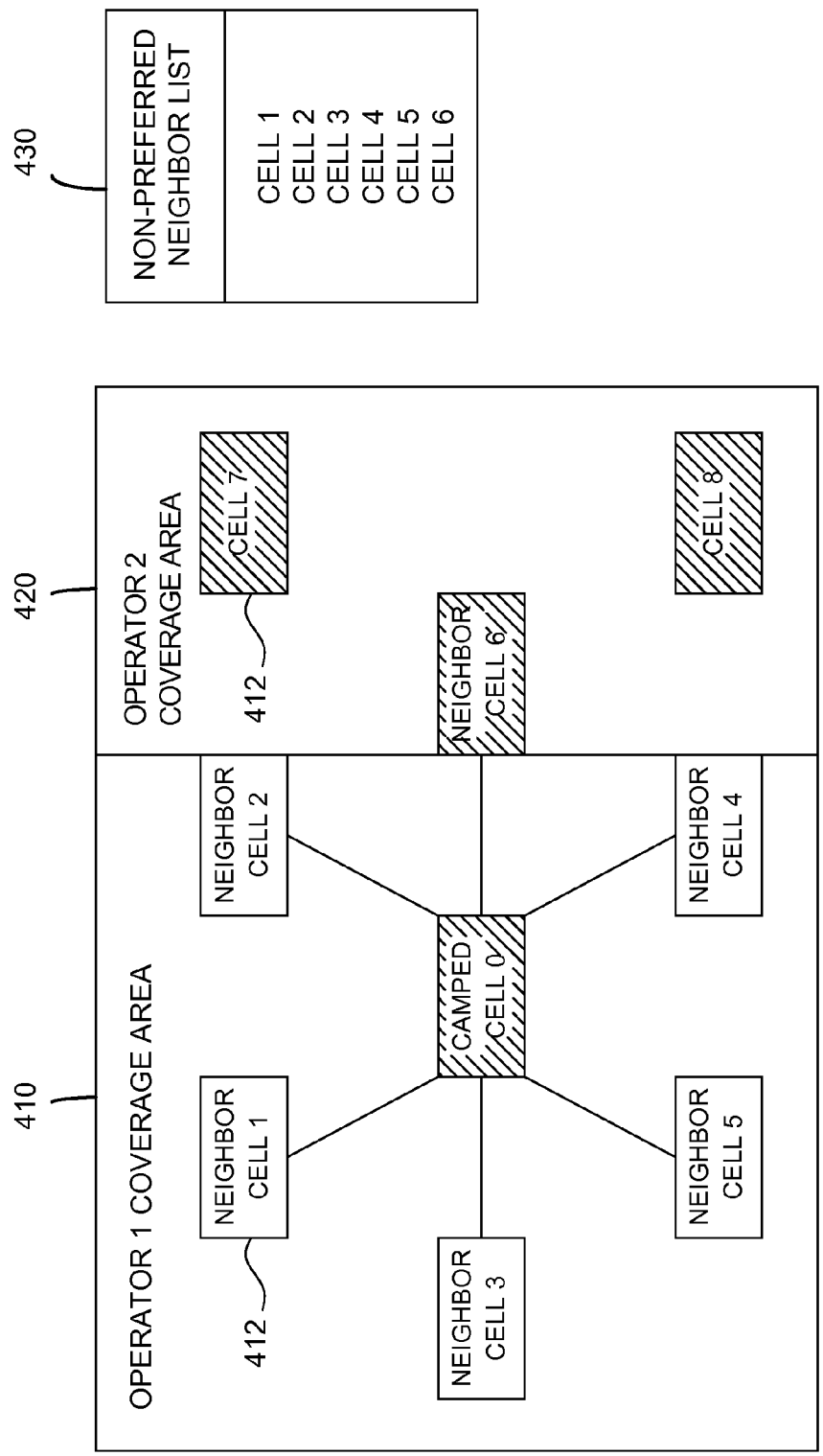
FIG. 4 illustrates a boundary area with neighbor cells that belong to different operators in accordance with certain embodiments of the present disclosure.

FIG. 4 illustrates an example boundary area composed of a plurality of neighbor network cells 412 controlled by different operators. In the illustrated example, a mobile user is currently camped on cell 0 that, along with a first set of neighbor cells 1-5 are all within a first operator's coverage area 410. On the other hand, neighbor cell 6 is in a second operator's coverage area 420, along with cells 7 and 8. Using a conventional approach, a wireless device may generate a non-preferred neighbor list 430 (that includes neighbor cells 1-6 from both operators) for cell reselection.

The cell reselection process may be performed either automatically by the wireless device or may be instructed by the wireless network through the L3 cell change procedure. In order to avoid switching to neighbor cell 6, controlled by a different operator than the currently camped cell 0, certain embodiments of the present disclosure may allow neighbor cells in the first operator's coverage area 410 to be given preference as the newly camped cell in the cell re-selection process during the handover process. For certain embodiments, a user of the wireless device may be prompted to intervene in the cell reselection process, by favoring those neighbor cells that share the same operator with the currently camped cell.

Figure 5:
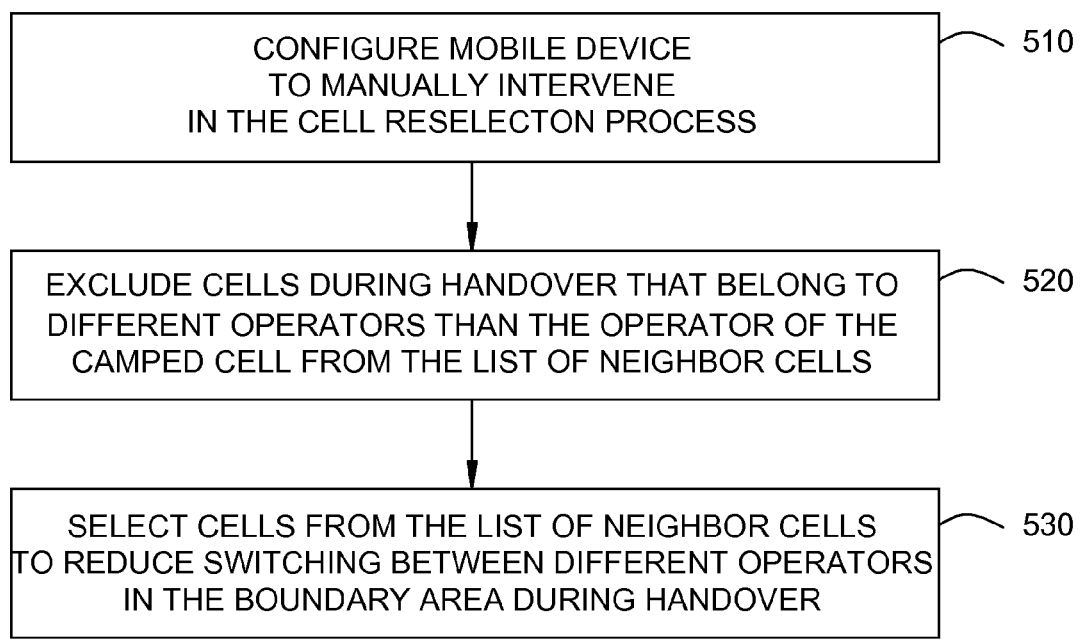
FIG. 5 illustrates example operations for cell selection between neighbor cells belonging to different operators in accordance with certain embodiments of the present disclosure.

FIG. 5 illustrates example operations 500 for cell selection in the case when neighbor cells belong to different operators, assuming no coordination between the different operators. The operations may be performed, for example, as a wireless device moves from the coverage area of one cell (camped cell) to the coverage area of another neighbor cell.

The operations 500 begin, at 510, by configuring a mobile device to allow manual intervention during the cell reselection process. The wireless device may manually intervene, for example, by excluding from the list of available neighbor cells those cells that belong to different operators from the operator of the camped cell when a handover is requested, at 520. At 530, the wireless device may select one cell from the list of neighbor cells during the handover process to switch from the camped cell to the newly serving cell, while keeping the same operator.

Figure 6:
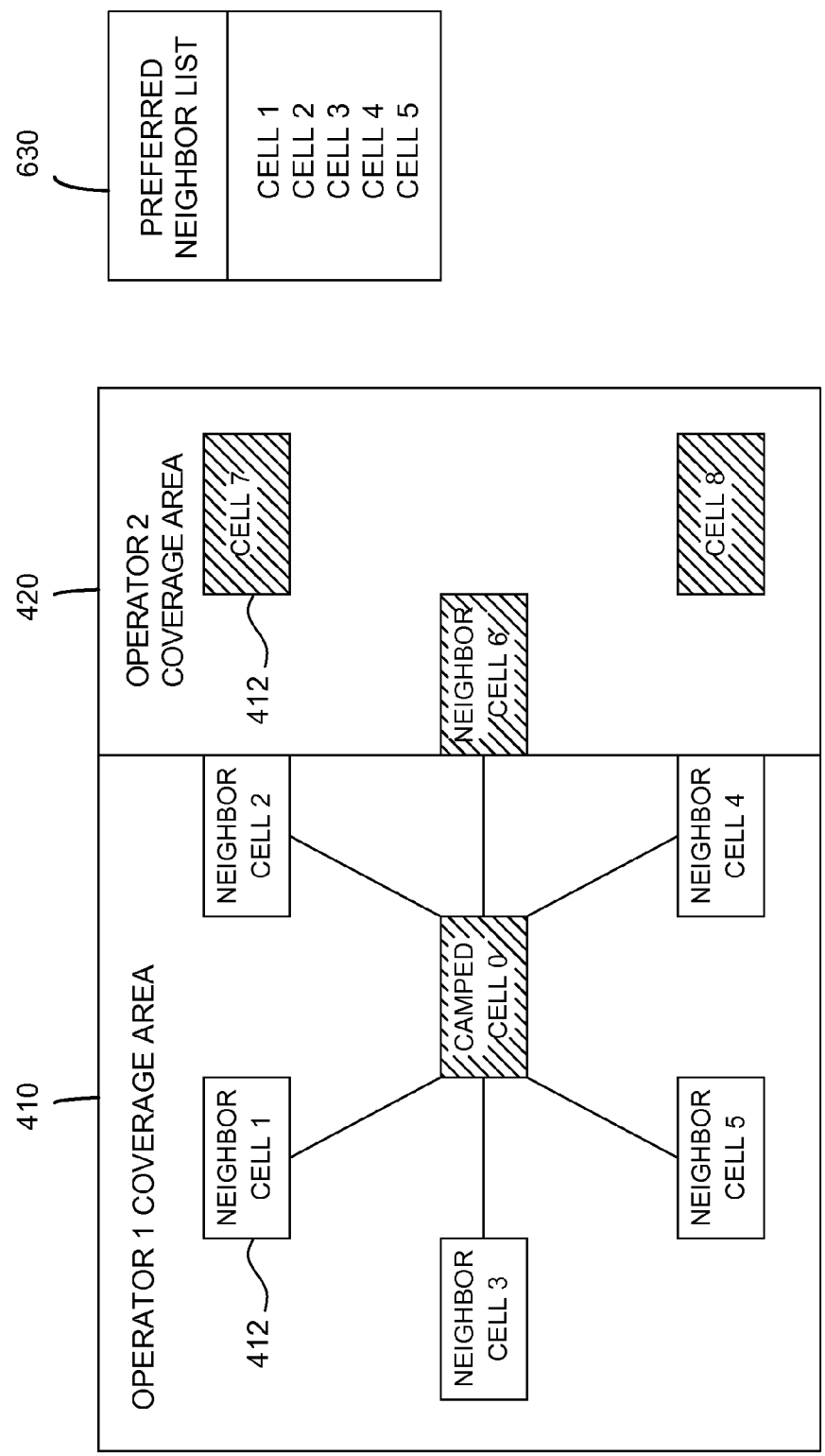
FIG. 6 illustrates the exclusion of cells belonging to a different operator from a list of neighbor cells in accordance with certain embodiments of the present disclosure.

FIG. 6 illustrates the exclusion of cells belonging to the secondary operator (operator 2) from the list of neighbor cells, while cells controlled by the primary operator (operator 1) are included in the list of neighbor cells. The exclusion of cell 6 as a neighbor is indicated by removal of the dashed lines to the current camped cell 0 (present in FIG. 4) and also by the exclusion of cell 6 from a preferred list of neighbor cells 630.

Exactly how a wireless device excludes neighbor cells of different operators may vary with different embodiments. For certain embodiments, a process of generating a new list of neighbor cells may be achieved by giving higher priority to neighbor cells that belong to the primary operator and lower priority to neighbor cells that belong to the secondary operator. The lower priority given to secondary operator neighbor cells may lead to the result that such cells will only be added to the neighbor list if there are not any (or not a sufficient number) of primary operator neighbor cells with sufficient signal quality to add to the neighbor list.

For certain embodiments, a wireless device may be configured to give preference to primary operator neighbor cells during a configuration process. For certain embodiments, an end user may be able to enable/disable such a feature, for example via a setup user interface. As previously mentioned, a reduction of switching between different operators achieved by applying the proposed manual cell selection may decrease power consumption and processing operations related to camping to different base stations that belong to different operators. In addition, taking measures to reduce switching between operators may also decrease the financial cost that the primary operator incurs in payments to the secondary operator.

Exemplary Manual Cell Selection in a Boundary Area with Multiple Time Zones

Figure 7:
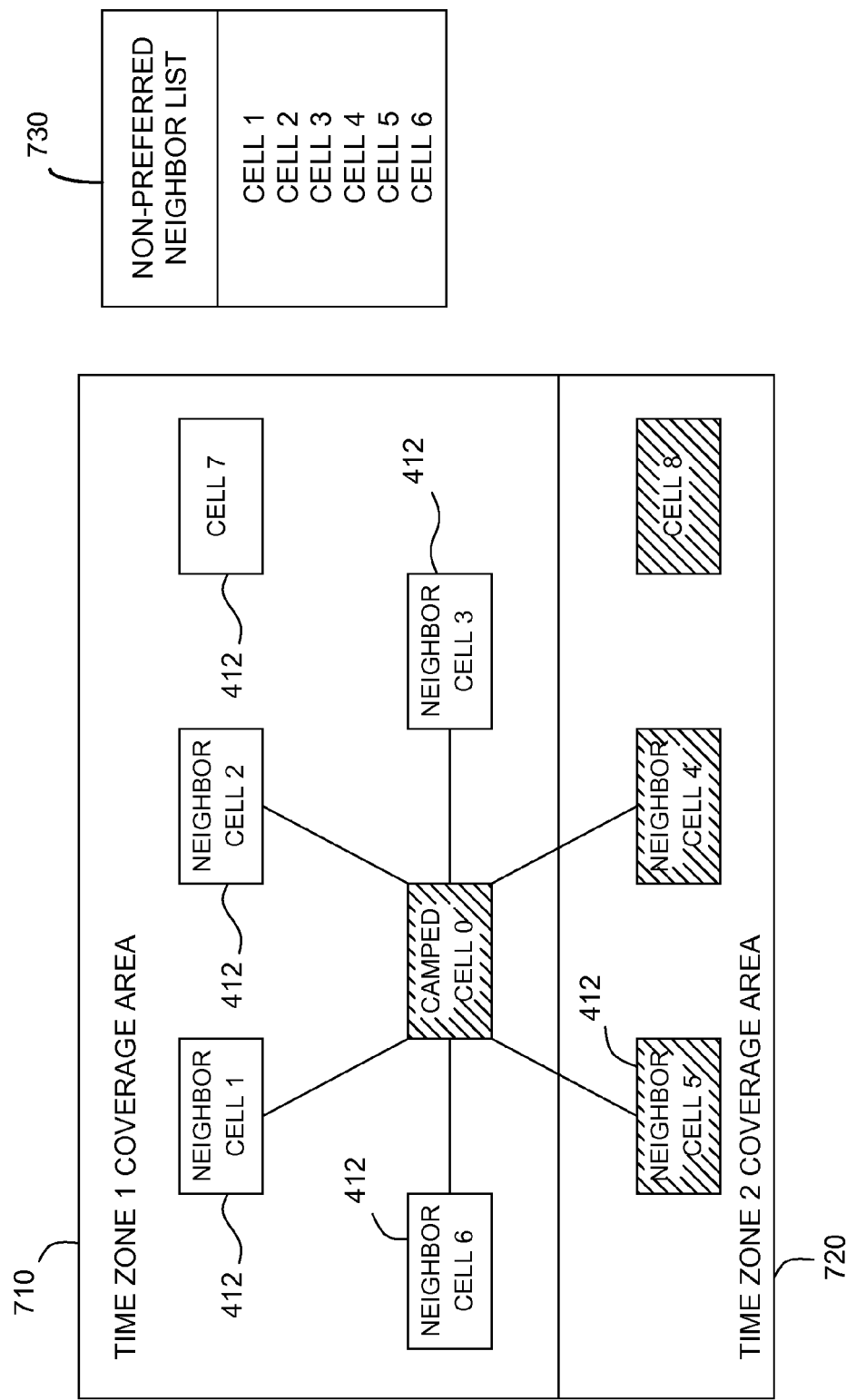
FIG. 7 illustrates a boundary area of neighbor cells that belong to different time zones in accordance with certain embodiments of the present disclosure.

FIG. 7 illustrates an example boundary area composed of a plurality of neighbor network cells 412 belonging to different time zones. In the illustrated example, a mobile user is currently camped on cell 0 that, along with a first set of neighbor cells 1, 2, 3, 6 and 7, are all within the coverage area 710 of a first time zone. On the other hand, neighbor cells 4 and 5, along with cell 8 are in a coverage area 720 of a second time zone. Using a conventional approach, with no regard to time zones, a wireless device may generate a neighbor list 730 (that includes neighbor cells 1-6 from both time zones) for cell reselection.

Unfortunately, if the wireless device frequently switches between cells belonging to different time zones, the wireless device time may frequently need to be synchronized, which may consume power and processing resources. In addition, frequently switching wireless device time may be confusing to a mobile user.

For certain embodiments of the present disclosure, however "dual clock" time information derived from both time zones may be available at the wireless device when the wireless device performs the cell reselection. By presenting information from both time zones to a mobile user (e.g., by displaying current time from both time zones on a display of the wireless device), the mobile user may become aware that they are in the boundary area between two different time zones. For certain embodiments, the mobile user may be able to intervene in the selection of a cell, for example, by specifying some type of selection criterion, such as signal quality or best quality of service. For certain embodiments, a mobile user may be allowed to specify whether the wireless device should give preference to a neighbor in the same time zone as the currently camped cell, if one is available, or allow conventional switching to a new cell, even if it is in another time zone.

With certain mobile stations, it may not be practical or possible to display dual clock information derived from two different time zones. In such cases, the wireless device may be configured to intervene in cell reselection, in a similar manner described above with reference to cells for different operators. For example, cells in the same time zone as a currently camped cell may be given higher priority than those in a different time zone.

Figure 8:
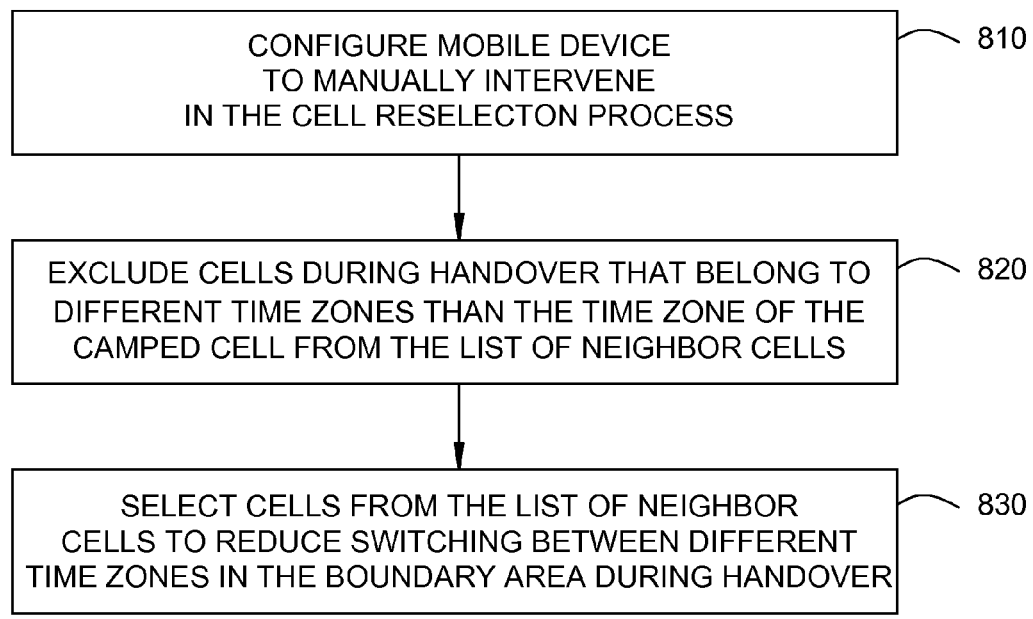
FIG. 8 illustrates example operations for cell selection between neighbor cells belonging to different time zones in accordance with certain embodiments of the present disclosure.

FIG. 8 illustrates example operations 800 for selecting a cell in the case when neighbor cells belong to different time zones. At 810, the wireless device may be configured to manually intervene in the cell reselection process. The configuration may be done, for example, during a configuration process at manufacture, when the wireless device is activated, or by a user through a setup interface.

The wireless device may manually intervene, for example, by excluding from the list of available neighbor cells those cells that belong to a different time zone than the camped cell when a handover is requested, at 820. At 830, the wireless device may select one cell from the list of neighbor cells during the handover process to switch from the camped cell to the newly serving cell, possibly maintaining the wireless device time in the same time zone.

Figure 9:
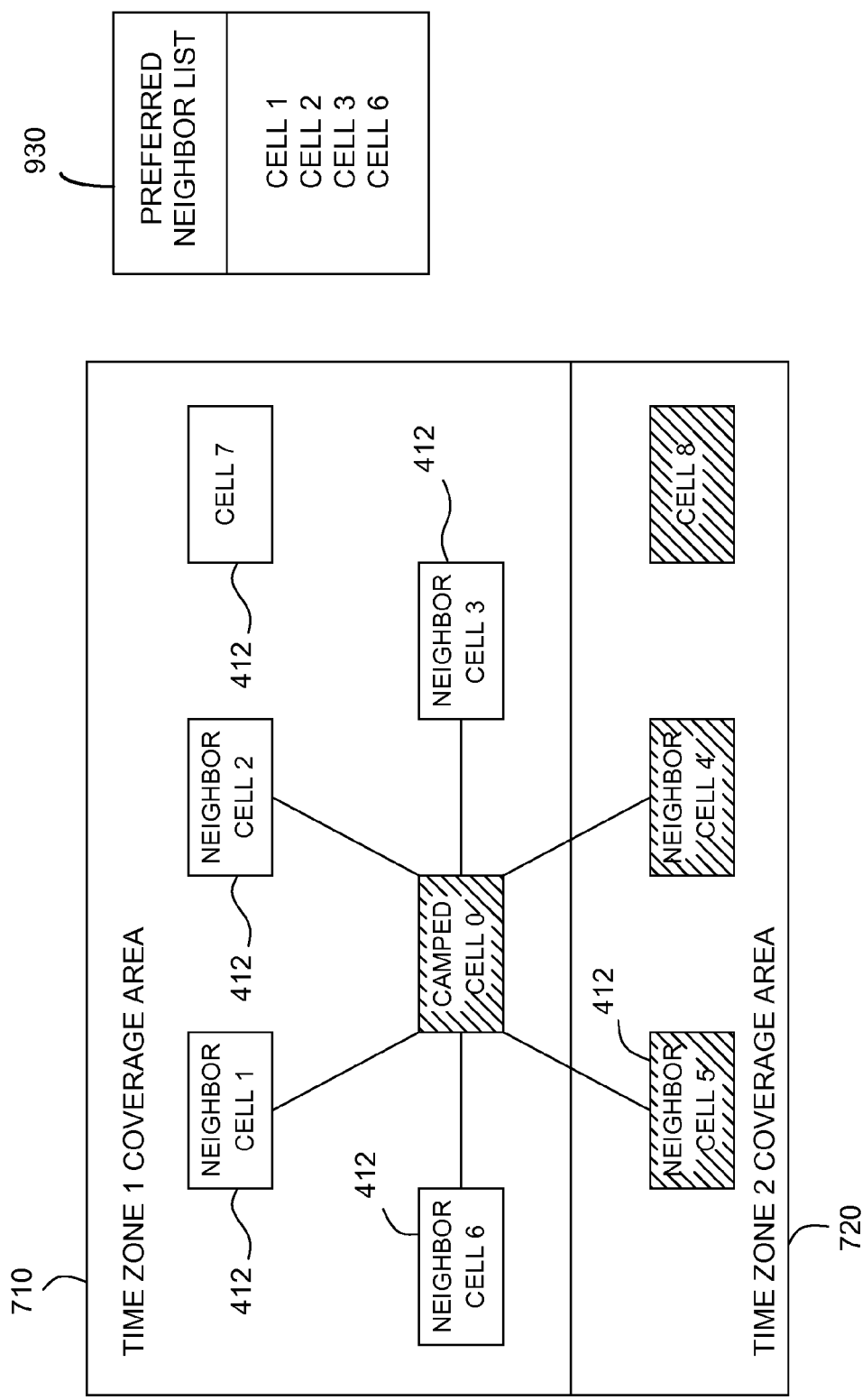
FIG. 9 illustrates the exclusion of neighbor cells belonging to a different time zone from a list of neighbor cells in accordance with certain embodiments of the present disclosure.

FIG. 9 illustrates the exclusion of cells belonging to the second time zone (time zone 2) from the list of neighbor cells, while cells belonging to the first time zone (time zone 1) are included in the list of neighbor cells. The exclusion of cells 4 and 5 as neighbors is indicated by removal of the dashed lines to the current camped cell 0 (present in FIG. 7) and also by the exclusion of cells 4 and 5 from a preferred list of neighbor cells 930.

As in the case of multiple operators, exactly how a wireless device excludes neighbor cells belonging to different time zones may vary with different embodiments. For certain embodiments, a process of generating a new list of neighbor cells may be achieved by giving higher priority to neighbor cells that belong to the same time zone as the camped cell. The lower priority given to cells in a different time zone may lead to the result that such cells will only be added to the neighbor list if there are not any (or not a sufficient number) of cells in the time zone of the current camped cell with sufficient signal quality to add to the neighbor list.

For certain embodiments, a wireless device may be configured to give preference to neighbor cells in the same time zone as a current camped cell during a configuration process. For certain embodiments, an end user may be able to enable/disable such a feature, for example via a setup user interface.

As previously mentioned, a reduction of switching between different time zones achieved by applying the proposed cell selection may decrease power consumption and processing operations related to camping to different base stations that belong to different operators.

For certain embodiments, the techniques described above may be applied in boundary areas that include cells from different time zones and cells controlled by different operators. For example, a wireless device may be configured to give preference to cells that are controlled by the same operator and in the same time zone as a current camped cell. If there are no cells that meet both those criteria, preference may be given to a cell that meets at least one of these, in the manner described above. For certain embodiments, a user may be allowed to set a priority to establish whether a greater weight is given to selecting a cell with controlled by the same operator or in the same time zone as the current camped cell.

Figure 5A:
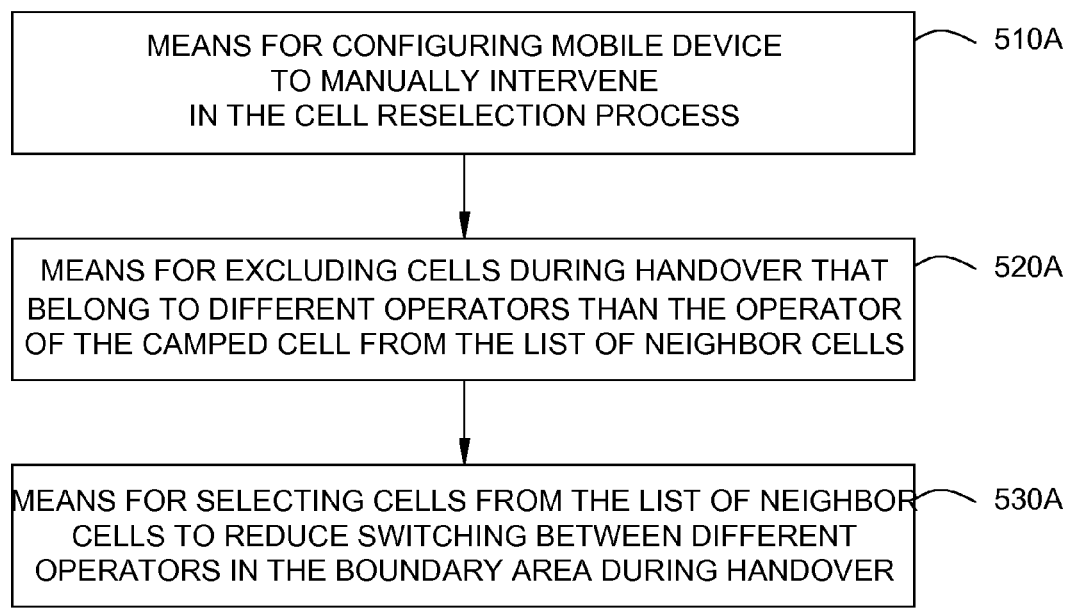
FIG. 5A illustrates example components capable of performing the operations illustrated in FIG. 5
Figure 8A:
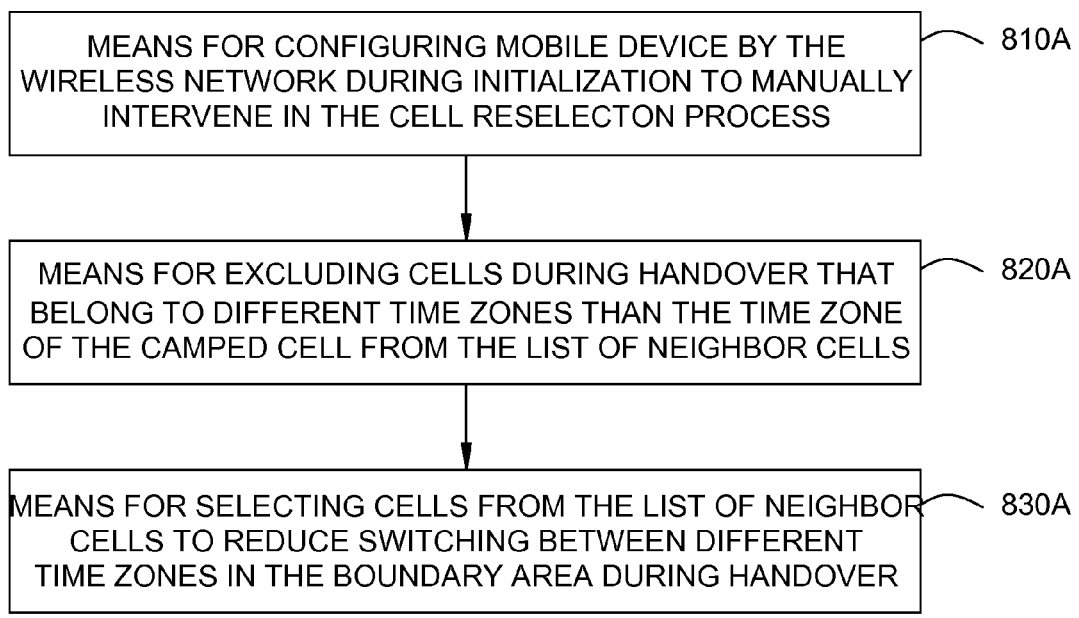
FIG. 8A illustrates example components capable of performing the operations illustrated in FIG. 8.

The various operations of methods described above may be performed by various hardware and/or software component(s) and/or module(s) corresponding to means-plus-function blocks illustrated in the Figures. For example, blocks 510-530 illustrated in FIG. 5 correspond to means-plus-function blocks 510A-530A illustrated in FIG. 5A. Similarly, blocks 810-830 illustrated in FIG. 8 correspond to means-plus-function blocks 810A-830A illustrated in FIG. 8A. More generally, where there are methods illustrated in Figures having corresponding counterpart means-plus-function Figures, the operation blocks correspond to means-plus-function blocks with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for selecting a new cell, from a plurality of cells in a boundary area between first and second time zones, for a wireless device to camp on, comprising:
    giving preference, when building a list of neighbor cells to consider as the new cell, to cells in a same time zone as a current camped cell by generating a list of neighbor cells that excludes cells that belong to time zones different from the time zone of the current camped cell from the list of neighbor cells; and
    selecting a cell from the list of neighbor cells as the new cell to camp on.

2. The method of claim 1, further comprising:
    deriving information regarding the first and second time zones; and
    presenting the information regarding the first and second time zones to a user of the wireless device.

3. The method of claim 2, further comprising:
presenting the user an option of whether or not to select a new cell in a time zone different from the current camped cell.

4. The method of claim 1, wherein giving preference, when building a list of neighbor cells to consider as the new cell, to cells in a same time zone as a current camped cell comprises:
giving a greater weight to one or more selection criteria for cells in a same time zone relative to cells in a different time zone.

5. A method for selecting a new cell, from a plurality of cells in a boundary area between first and second time zones, for a wireless device to camp on, comprising:
deriving first time information from a current camped cell in a first time zone the wireless device is currently camped on;
deriving second time information from a neighbor cell in a second time zone different from the first time zone;
presenting the first and second time information to a user of the wireless device; and
receiving input from the user based at least in part on the presented first and second time information, the input comprising a selection of one or more of the plurality of cells, the selected one or more of the plurality of cells being in the first time zone that the wireless device is currently camped on.

6. The method of claim 5, further comprising:
presenting the user an option of whether or not to select the neighbor cell to camp on.

7. The method of claim 5, wherein presenting the first and second time information to a user of the wireless device comprises displaying a current time in the first time zone and a current time in the second time zone to the user.

8. An apparatus for selecting a new cell, from a plurality of cells in a boundary area between first and second time zones, for a wireless device to camp on, comprising:
logic for giving preference, when building a list of neighbor cells to consider as the new cell, to cells in a same time zone as a current camped cell by generating a list of neighbor cells that excludes cells that belong to time zones different from the time zone of the current camped cell from the list of neighbor cells; and
logic for selecting a cell from the list of neighbor cells as the new cell to camp on.

9. The apparatus of claim 8, further comprising:
logic for deriving information regarding the first and second time zones; and
logic for presenting the information regarding the first and second time zones to a user of the wireless device.

10. The apparatus of claim 9, further comprising:
logic for presenting the user an option of whether or not to select a new cell in a time zone different from the current camped cell.

11. The apparatus of claim 8, wherein the logic for giving preference, when building a list of neighbor cells to consider as the new cell, to cells in a same time zone as a current camped cell is configured to:
give a greater weight to one or more selection criteria for cells in a same time zone relative to cells in a different time zone.

12. An apparatus for selecting a new cell, from a plurality of cells in a boundary area between first and second time zones, for a wireless device to camp on, comprising:
logic for deriving first time information from a current camped cell in a first time zone the wireless device is currently camped on;
logic for deriving second time information from a neighbor cell in a second time zone different from the first time zone;
logic for presenting the first and second time information to a user of the wireless device; and
logic for receiving input from the user based at least in part on the presented first and second time information, the input comprising a selection of one or more of the plurality of cells, the selected one or more of the plurality of cells being in the first time zone that the wireless device is currently camped on.

13. The apparatus of claim 12, further comprising:
logic for presenting the user an option of whether or not to select the neighbor cell to camp on.

14. The apparatus of claim 12, wherein the logic for presenting the first and second time information to a user of the wireless device is configured to display a current time in the first time zone and a current time in the second time zone to the user.

15. An apparatus for selecting a new cell, from a plurality of cells in a boundary area between first and second time zones, for a wireless device to camp on, comprising:
means for giving preference, when building a list of neighbor cells to consider as the new cell, to cells in a same time zone as a current camped cell by generating a list of neighbor cells that excludes cells that belong to time zones different from the time zone of the current camped cell from the list of neighbor cells; and
means for selecting a cell from the list of neighbor cells as the new cell to camp on.

16. The apparatus of claim 15, further comprising:
means for deriving information regarding the first and second time zones; and
means for presenting the information regarding the first and second time zones to a user of the wireless device.

17. The apparatus of claim 16, further comprising:
means for presenting the user an option of whether or not to select a new cell in a time zone different from the current camped cell.

18. The apparatus of claim 15, wherein the means for giving preference, when building a list of neighbor cells to consider as the new cell, to cells in a same time zone as a current camped cell is configured to:
give a greater weight to one or more selection criteria for cells in a same time zone relative to cells in a different time zone.

19. An apparatus for selecting a new cell, from a plurality of cells in a boundary area between first and second time zones, for a wireless device to camp on, comprising:
means for deriving first time information from a current camped cell in a first time zone the wireless device is currently camped on;
means for deriving second time information from a neighbor cell in a second time zone different from the first time zone;
means for presenting the first and second time information to a user of the wireless device; and
means for receiving input from the user based at least in part on the presented first and second time information, the input comprising a selection of one or more of the plurality of cells, the selected one or more of the plurality of cells being in the first time zone that the wireless device is currently camped on.

20. The apparatus of claim 19, further comprising:
means for presenting the user an option of whether or not to select the neighbor cell to camp on.

21. The apparatus of claim 19, wherein the means for presenting the first and second time information to a user of the wireless device is configured to display a current time in the first time zone and a current time in the second time zone to the user.

22. A computer-program product for selecting a new cell, from a plurality of cells in a boundary area between first and second time zones, for a wireless device to camp on, comprising a non-transitory computer readable medium having instructions stored thereon, the instructions being executable by one or more processors and the instructions comprising:
- instructions for giving preference, when building a list of neighbor cells to consider as the new cell, to cells in a same time zone as a current camped cell by generating a list of neighbor cells that excludes cells that belong to time zones different from the time zone of the current camped cell from the list of neighbor cells; and
- instructions for selecting a cell from the list of neighbor cells as the new cell to camp on.

23. The computer-program product of claim 22, wherein the instructions further comprise:
- instructions for deriving information regarding the first and second time zones;
- and instructions for presenting the information regarding the first and second time zones to a user of the wireless device.

24. The computer-program product of claim 23, wherein the instructions further comprise:
- instructions for presenting the user an option of whether or not to select a new cell in a time zone different from the current camped cell.

25. The computer-program product of claim 22, wherein the instructions for giving preference, when building a list of neighbor cells to consider as the new cell, to cells in a same time zone as a current camped cell comprise:
- instructions for giving a greater weight to one or more selection criteria for cells in a same time zone relative to cells in a different time zone.

26. A computer-program product for selecting a new cell, from a plurality of cells in a boundary area between first and second time zones, for a wireless device to camp on, comprising a non-transitory computer readable medium having instructions stored thereon, the instructions being executable by one or more processors and the instructions comprising:
- instructions for deriving first time information from a current camped cell in a first time zone the wireless device is currently camped on;
- instructions for deriving second time information from a neighbor cell in a second time zone different from the first time zone;
- instructions for presenting the first and second time information to a user of the wireless device; and
- receiving input from the user based at least in part on the presented first and second time information, the input comprising a selection of one or more of the plurality of cells, the selected one or more of the plurality of cells being in the first time zone that the wireless device is currently camped on.

27. The computer-program product of claim 26, wherein the instructions further comprise:
- instructions for presenting the user an option of whether or not to select the neighbor cell to camp on.

28. The computer-program product of claim 26, wherein the instructions for presenting the first and second time information to a user of the wireless device comprise instructions for displaying a current time in the first time zone and a current time in the second time zone to the user.

* * * * *